United States Patent [19]

Kerth et al.

[11] Patent Number: 5,147,928
[45] Date of Patent: Sep. 15, 1992

[54] PREPARATION OF PROPYLENE-ETHYLENE COPOLYMERS

[76] Inventors: Juergen Kerth, 15 Wattenheimer Strasse, 6719 Carlsberg; Harald Schwager, 7 Ziegelofenweg, 6720 Speyer; Ralf Zolk, 7 Weinbietstrasse, 6714 Weisenheim, all of Fed. Rep. of Germany

[21] Appl. No.: 660,252

[22] Filed: Feb. 25, 1991

Related U.S. Application Data

[63] Continuation of Ser. No. 476,804, Feb. 8, 1990.

[30] Foreign Application Priority Data

Feb. 11, 1989 [DE] Fed. Rep. of Germany ....... 3904079

[51] Int. Cl.$^5$ ............................................. C08F 297/08
[52] U.S. Cl. ........................................ 525/53; 525/52; 525/322; 525/323; 525/324
[58] Field of Search .................. 525/52, 53, 322, 323

[56] References Cited

U.S. PATENT DOCUMENTS

| 4,454,299 | 6/1984 | Schweier et al. | 525/53 |
| 4,455,405 | 6/1984 | Jaggard et al. | 525/53 |

FOREIGN PATENT DOCUMENTS

| 0202946 | 11/1986 | European Pat. Off. | 525/323 |
| 84/3561 | 5/1984 | South Africa . | |
| 84/3563 | 5/1984 | South Africa . | |
| 84/5261 | 7/1984 | South Africa . | |
| 1032945 | 6/1966 | United Kingdom . | |

OTHER PUBLICATIONS

Denbigh, K. "The Principles of Chemical Equilibrium", Cambridge, Cambridge University Press, 4th ed., 1981, p. 116.

Primary Examiner—James J. Seidleck
Assistant Examiner—Vasu S. Jagannathan
Attorney, Agent, or Firm—Keil & Weinkauf

[57] ABSTRACT

Propylene-ethylene copolymers are prepared in an agitated bed of solids by first polymerizing propylene from the gas phase in a first polymerization zone at 20–40 bar and 60°–90° C. by addition of a Ziegler-Natta catalyst system, and copolymerizing in a second polymerization zone at 7–35 bar and 40°–70° C. the finely divided polymer from the first polymerization zone with a mixture of olefins a process which comprises copolymerizing in the second polymerization zone with a mixture of propylene, ethylene and a further α-olefin of from 4 to 10 carbon atoms, setting the ratio of the partial pressures between propylene and ethylene within the range from 100:20 to 100:120 and that of the partial pressures between propylene and the further α-olefin within the range from 100:1 to 100:20, setting the pressure in the second polymerization zone at at least 5 bar below the pressure in the first polymerization zone, and determining the weight ratio between the monomers reacted in the first polymerization zone and those reacted in the second polymerization zone in such a way that said weight ratio is within the range from 100:10 to 100:50.

2 Claims, No Drawings

PREPARATION OF PROPYLENE-ETHYLENE COPOLYMERS

This application is a continuation of application Ser. No. 07/476,804, filed on Feb. 8, 1990.

The present invention relates to a process for preparing propylene-ethylene copolymers by gas phase polymerization in an agitated bed of solids with the aid of a Ziegler-Natta catalyst system.

Processes for preparing propylene-ethylene copolymers by Ziegler-Natta polymerization have already been described in a number of patents. U.S. Pat. No. 4,260,710 discloses preparing homopolymers and copolymers of α-olefins by polymerization with the aid of Ziegler-Natta catalysts in a stirred vessel. The catalyst components used therein contain inter alia compounds of multivalent titanium, aluminum halides and or alkyls, and also electron donor compounds, usually silanes, esters, ethers, ketones or lactones (EP-B-14,523, EP-B-45,977, EP-B-86,473, EP-A-171,200).

Furthermore, a number of processes for preparing propylene-ethylene block copolymers with the aid of a Ziegler-Natta catalyst system are known (U.S. Pat. No. 4,454,299, U.S. Pat. No. 4,455,405, ZA-B-0084/3561, ZA-B-0084/3563, ZA-B-0084/5261, GB-B-1,032,945), wherein gaseous propylene is first polymerized in a first reaction zone and the homopolymer obtainable therefrom is then introduced into a second reaction zone for copolymerization with a mixture of ethylene and propylene. The process is usually carried out under superatmospheric pressure and in the presence of hydrogen as molecular weight regulator. The impact strength of the copolymers obtainable by the process is usually good, but their stiffness is much reduced compared with pure propylene. However, for some applications there is a predominant need for copolymers which are both sufficiently impact resistant for practical purposes and very stiff. Besides, the copolymers frequently still contain catalyst residues, in particular titanium, aluminum and chlorine, limiting their usefulness inter alia in the food and hygiene sectors.

It is an object of the present invention to eliminate the above disadvantages and to develop a process which makes it possible to prepare propylene-ethylene copolymers of increased stiffness which are at the same time still sufficiently impact resistant and have lower catalyst contents.

We have found that this object is achieved by a process for preparing a propylene-ethylene copolymer is an agitated bed of solids by first polymerizing propylene from the gas phase in a first polymerization some at 20–40 bar and 60°–90° C. by addition of a Ziegler-Natta catalyst system, and copolymerizing in a second polymerization zone at 7–35 bar and 40°–70° C. the finely divided polymer from the first polymerization zone with a mixture of propylene, ethylene and a further α-olefin of from 4 to 10 carbon atoms, which comprises setting the ratio of the partial pressures between propylene and ethylene within the range from 100:20 to 100:120 and that of the partial pressures between propylene and the further α-olefin within the range from 100:1 to 100:20, setting the pressure in the second polymerization zone at at least 5 bar below the pressure in the first polymerization zone, and determining the weight ratio between the monomers reacted in the first polymerization zone and those reacted in the second polymerization zone in such a way that said weight ratio is within the range from 100:10 to 100:50.

The process can be carried out either batchwise or preferably continuously in a conventional polymerization reactor. Suitable reactors include inter alia continuous stirred tank reactors. Such reactors, if used, are usually used in the form of two or more such reactors connected in series. The reactors contain a bed of finely divided polymer solids which is usually kept in a state of agitation by suitable stirrer means.

The process can be carried with a conventional Ziegler-Natta polymerization catalyst. This catalyst contains among other components not only multivalent titanium and aluminum complexes but also electron donor compounds. Preference is given to using a titanium component which is based on a finely divided silica gel, responsible for the shape, and contains magnesium, chlorine and a benzine carboxylic acid derivative as well as titanium. Further catalyst constituents are trialkylaluminum compounds and silane complexes with up to four different alkyl, aryl or alkoxy moieties as electron donor compounds.

The preferred titanium component is prepared in three stages.

In the first stage, $SiO_2 \cdot xAl_2O_3$ (x=0–3) which has a particle diameter of up to 1000 μm, a pore volume of not less than 0.3 cm$^3$/g and a surface area of more than 100 m$^2$/g is admixed with a solution, in a liquid alkane, of a dialkylmagnesium compound containing an alkyl moiety of up to 10 carbon atoms, and this mixture is stirred at elevated temperature for some hours. From 0.1 to 1 mole of the organic magnesium compound is used per mole of $SiO_2 \cdot xAl_2O_3$. Thereafter, while stirring continuously, chlorine or gaseous hydrogen chloride is introduced in at least twofold molar excess, based on the organomagnesium compound. After about 30–60 minutes, the solid is separated from the liquid phase.

In the second stage, this product is added to a liquid alkane, followed by an alkanol of up to 8 carbon atoms, in particular ethanol, and then by a titanium tetrachloride and a dialkoxy ester derivative of phthalic acid. Preferably, one of these alkoxy moieties should not have more than 8 carbon atoms. The proportions used per mole of magnesium in the solid product of the first stage are from 1 to 5 moles of alkanol, from 2 to 20 moles of titanium tetrachloride and from 0.01 to 1 mole of the phthalic acid derivative. The solution is stirred at elevated temperature for at least one hour, and the solid product obtained is then filtered off.

In the third stage, the solid product from the second stage is extracted for some hours at more than 100° C. with excess titanium tetrachloride or an excess of a not less than 5% strength by weight solution of titanium tetrachloride in an alkylbenzene. Thereafter, the product is washed with a liquid alkane until the wash liquor contains less than 2% by weight of titanium tetrachloride.

The aluminum component used in the process according to the present invention is a trialkylaluminum compound in which the alkyl moiety contains up to 8 carbon atoms. Examples thereof are triethylaluminum and trimethylaluminum.

Preferred electron donor compounds include inter alia silanes having alkyl, aryl or alkoxy moieties of not more than 10 carbon atoms per substituent. It is particularly advantageous to use isobutylisopropyldimethoxysilane and triethyoxytoluylsilane.

In a preferred catalyst embodiment, the atomic ratio between titanium and aluminum is within the range from 1:20 to 1:200 and the molar ratio between the aluminum and the silane component is within the range from 1:0.01 to 1:0.5. The individual catalyst constituents can be introduced into the polymerization system individually or as mixtures of two components in any desired order.

After the propylene polymerization has ended, the polymer is discharged from the first polymerization zone together with the catalyst and introduced into the next polymerization zone where, as described above, it is copolymerized with ethylene, propylene and a further α-olefin of from 4 to 10 carbon atoms. Particularly suitable further α-olefin are 1-butene, 1-pentene, 1-hexene and 1-heptene.

The average residence times in the two polymerization zones are in each case from 0.1 to 20, preferably from 0.5 to 10, hours. The molecular weight of the polymers can be controlled in a conventional manner by the addition of a regulator, in particular hydrogen.

The copolymer prepared by the process according to the present invention has a melt flow index of from 0.1 to 100 g/10 min, preferably from 0.2 to 10 g/10 min, measured by German Standard Specification DIN 53 735 at 230° C. under a load of 2.16 kg. This melt flow index indicates the amount of polymer forced out of the test apparatus standardized according to German Standards Specification DIN 53 735 at 230° C. under a weight of 2.16 kg in the course of 10 minutes. The process makes it possible to prepare copolymers of excellent stiffness, improved free-flow characteristics and a notched impact strength which meets the practical requirements. The copolymer contains only minor amounts of catalyst constituents.

Owing to its good mechanical properties, this copolymer is suitable in particular for producing films, pipes, coatings, fibers, blow moldings, injection moldings and shaped articles for automotive construction.

EXAMPLE

The process was carried out in the presence of hydrogen as molecular weight regulator in two successive stirred autoclaves each having a useful capacity of 180 l. Both reactors contained an agitated bed of finely divided polymer solids.

Gaseous propylene was introduced into the first polymerization reactor at 28 bar and 70° C. and polymerized therein in the course of an average residence time of 3 hours with the aid of a Ziegler-Natta catalyst. This catalyst, besides containing a titanium component, contained triethylaluminum and isobutylisopropyldimethoxysilane, the atomic ratio of titanium to aluminum being 1:100 and the molar ratio of triethylaluminum to the silane component being 1:0.1. The titanium component had been prepared by the preferred method described above.

To the polypropylene was then added in a first stage $SiO_2 \cdot xAl_2O_3$ having a particle diameter of from 20 to 45 μm, a pore volume of 1.75 cm$^3$/g and a surface area of 320 m$^2$/g together with a solution of butyloctylmagnesium in n-heptane, 0.5 mole of the magnesium compound being added per mole of $SiO_2 \cdot xAl_2O_3$. The solution was stirred at 90° C. for 1.5 hours, then cooled down to 20° C. and thereafter admixed with 10 times the molar amount, based on the organomagnesium compound, of hydrogen chloride introduced in gas form. After 30 minutes, the solid-phase product was separated from the solvent.

The product obtainable from the first stage was dissolved again in n-heptane. 3 mole parts of ethanol, based on 1 mole part of magnesium, were then added with continuous stirring. This solution was stirred at 80° C. for 1.5 hours and then admixed with 6 mole parts of titanium tetrachloride and 0.5 mole part of di-n-butyl phthalate, each amount being based on 1 mole part of magnesium. The solution was stirred for a further two hours, and then the solid was separated from the solvent by filtering with suction.

The product obtainable therefrom was extracted for two hours at 125° C. with a 15 percent strength by weight solution of titanium tetrachloride in ethylbenzene. Thereafter, the solid product was separated from the extractant by filtration and washed with n-heptane until the wash liquor contained only 0.3% by weight of titanium tetrachloride.

The propylene polymer formed in the first reactor was then transferred together with the catalyst into the second stirred autoclave and copolymerized therein at a total pressure of 11 bar and at 50° C. with a mixture of propylene, ethylene and 1-butene in the course of an average residence time of 1 hour. The ratio of the partial pressures between propylene, ethylene and 1-butene was 100:47:6. The weight ratio between the propylene polymer formed in the first reactor and the copolymer formed in the second reactor was 100:20.

This Example produces a copolymer of propylene, ethylene and 1-butene having a melt flow index of 2.0 g/10 min at 230° C. and 2.16 kg (by German Standard Specification DIN 53 735). Its mechanical properties are given in the Table below. The titanium content of the copolymer according to the present invention is 2 ppm and the chlorine content is 11 ppm.

COMPARATIVE EXAMPLE

The run was repeated in the same reactor arrangement under identical conditions, except that the monomer mixture added in the second polymerization zone did not contain any 1-butene. The resulting copolymer had the same melt flow index but distinctly poorer free-flow characteristics and a significantly lower stiffness.

The precise results are given in the Table below.

TABLE

| | Melt flow [a] index (g/10 min) | Median [b] particle diameter (mm) | Free-flow [c] characteristics (g/sec) | Notched [d] impact strength (kJ/m$^2$) | Stiffness [e] (N/mm) |
|---|---|---|---|---|---|
| Example | 2.0 | 1.53 | 50.0 | no fracture | 500 |
| Comparative | 2.0 | 1.71 | 38.4 | no fracture | 350 |

TABLE-continued

| | Melt flow [a] index (g/10 min) | Median [b] particle diameter (mm) | Free-flow [c] characteristics (g/sec) | Notched [d] impact strength (kJ/m$^2$) | Stiffness [e] (N/mm) |
|---|---|---|---|---|---|
| Example | | | | | |

[a] in accordance with German Standard Specification DIN 53 735 at 230° C. under a load of 2.16 kg
[b] by sieve analysis
[c] in accordance with German Standard Specification DIN 53 492
[d] in accordance with German Standard Specification DIN 53 453
[e] in accordance with German Standard Specification DIN 53 445

We claim:

1. A process for preparing a propylene-ethylene copolymer in an agitated bed of solids by first polymerizing propylene from the gas phase in a first polymerization zone at 20-40 bar and 60°-60° C. by addition of a Ziegler-Natta catalyst system, and copolymerizing in a second polymerization zone at 7-35 bar and 40°70° C. the finely divided polymer from the first polymerization zone with a mixture of olefins, which comprises copolymerizing in the second polymerization zone the finely divided polymer from the first polymerization zone with a mixture of propylene, ethylene and a further α-olefin of from 4 to 10 carbon atoms, setting the ratio of the partial pressures between propylene and ethylene within the range from 100:20 to 100:120 and that of the partial pressures between propylene and the further α-olefin within the range from 100:1 to 100:20, setting the pressure in the second polymerization zone at at least 5 bar below the pressure in the first polymerization zone, and determining the weight ratio between the monomers reacted in the first polymerization zone and those reacted in the second polymerization zone in such a way that said weight ratio is within the range from 100:10 to 100:50.

2. A copolymer obtained by a process as claimed in claim 1.

* * * * *